United States Patent [19]

Leutner et al.

[11] 4,120,631
[45] Oct. 17, 1978

[54] INJECTION-MOLDING MACHINE FOR SYNTHETIC PLASTIC MATERIAL

[75] Inventors: Volkmar Leutner; Roman Romes, both of Friolzheim, Fed. Rep. of Germany

[73] Assignee: Robert Bosch GmbH, Stuttgart, Fed. Rep. of Germany

[21] Appl. No.: 664,806

[22] Filed: Mar. 8, 1976

[30] Foreign Application Priority Data

Mar. 29, 1975 [DE] Fed. Rep. of Germany ....... 2514009

[51] Int. Cl.² ............................................. B29F 1/06
[52] U.S. Cl. .................................. 425/145; 425/149
[58] Field of Search .............. 425/135, 145, 147, 149, 425/245 NS; 264/328

[56] References Cited

U.S. PATENT DOCUMENTS

| | | | |
|---|---|---|---|
| 3,767,339 | 10/1973 | Hunkar | 425/145 |
| 3,822,057 | 7/1974 | Wheeler | 425/145 |
| 3,840,312 | 10/1974 | Paulson et al. | 425/149 |
| 3,893,792 | 7/1975 | Laczko | 425/149 |
| 3,932,083 | 1/1976 | Boettner | 425/145 |
| 3,941,534 | 3/1976 | Hunkar | 425/145 |

Primary Examiner—Francis S. Husar
Assistant Examiner—William R. Briggs
Attorney, Agent, or Firm—Michael J. Striker

[57] ABSTRACT

The injection-molding machine is operative when activated for performing a complete injection-molding cycle. The machine includes a mold defining a mold cavity, a plastifying and injecting screw, and an hydraulic cylinder-and-piston unit for driving the screw. During the course of a single injection-molding cycle, negative-feedback control of the pressure in the mold cavity undergoes an automatic transition into negative-feedback control of the pressure in the hydraulic cylinder of the cylinder-and-piston unit. The transition is selected to be abrupt or gradual, and if gradual there will be a transitional interval during which a composite negative-feedback control of both the mold cavity and hydraulic cylinder pressures is occurring.

18 Claims, 4 Drawing Figures

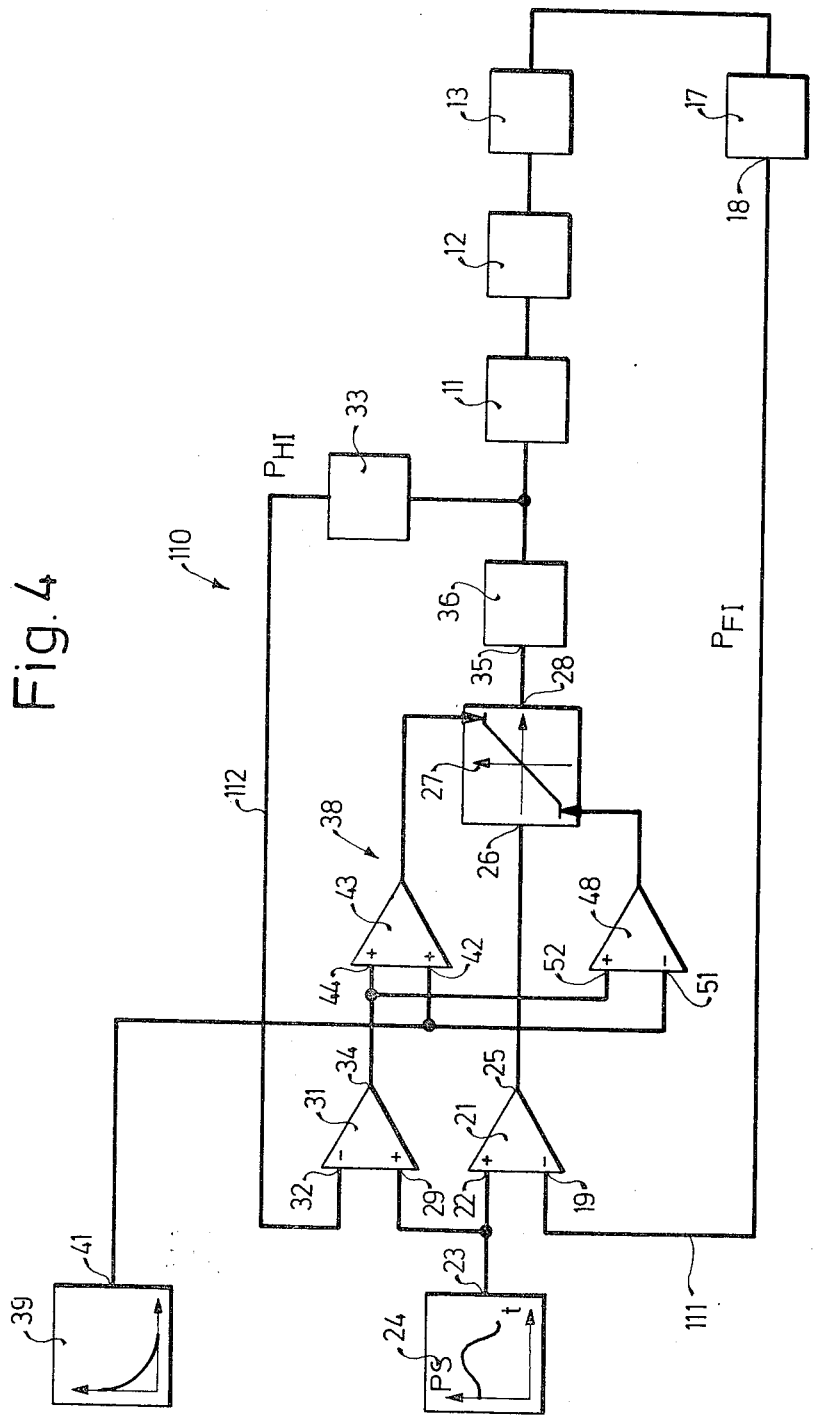

INJECTION-MOLDING MACHINE FOR SYNTHETIC PLASTIC MATERIAL

BACKGROUND OF THE INVENTION

The invention relates to injection-molding machines for injecting synthetic plastic material in plastic condition into a mold cavity, particularly using a plastifying and injecting screw driven by an hydraulic cylinder-and-piston unit. Still more particularly, the invention relates to the problem of regulating the pressure in the hydraulic cylinder in dependence upon a signal furnished by a desired-value signal generator.

Already known is an injection-molding machine provided with a programming arrangement. Under the control of the programming arrangement, an hydraulically activatable screw performs first the mold-filling phase during which resort is had to a distance-dependent velocity regulation (negative-feedback control of velocity). The mold-filling phase is followed by the pressing phase during which the hydraulic cylinder pressure is regulated in dependence upon pressure. With this known arrangement, only the pressure in the hydraulic cylinder is taken into account, even though this pressure will during certain portions of the injection-molding cycle deviate very markedly from the pressure in the mold cavity. This discrepancy between the pressures in the drive cylinder and in the mold cavity leads frequently to inferior quality of the molded finished product and/or to reproducibility difficulties. The difference which develops during the molding cycle as between the pressures in the hydraulic drive cylinder, on the other hand, and in the mold cavity, on the other hand, is attributable mainly to the viscosity changes undergone by the material in the mold cavity as such material is subjected to temperature changes, and also to differences in the charges employed.

It is also known to control an injection-molding machine by measuring the pressure in the mold cavity and in dependence thereon controlling the fluid pressure in the hydraulic cylinder. However, the heretofore utilized pressure control expedients of this type did not involve a complete closed-loop regulation (negative-feedback control). Also, the pressure control worked only during the phase in which synthetic plastic material is filled into and pressed solid in the mold cavity, with a predetermined pressure point in the pressure rise phase being compared with a desired value of pressure, so that in the case of an error signal the volumetric throughput of material to the mold cavity can be appropriately altered while the injection phase is still actually in progress. This known control technique rests on the assumption that upon reaching of a predetermined pressure value in an initial portion of the cycle it will automatically happen that in the subsequent course of the cycle a second predetermined command value will actually be reached. A disadvantage of this approach is that despite the efforts to the contrary there can develop within the mold cavity pressures having a detrimental influence upon the actual course of performance of the cycle itself or upon the quality of the finished product.

It is also known to provide an injection-molding machine with a closed-loop regulating circuit (negative-feedback control circuit) for continuously regulating (by means of negative feedback) the pressure in the mold cavity. However, this particular prior-art arrangement has the disadvantage that subsequent to the mold-filling phase, as the material in the mold begins to set during the compression phase, it becomes impossible to perform pressure measurements of absolute reliability. This is particularly the case when the material undergoing setting shrinks and moves out of contact with a pressure-measuring device located within the mold cavity or flush with the wall of the mold cavity; as the shrinking material moves out of contact with the pressure-measuring device, the latter generates a signal indicative of very low or even zero pressure, which by virtue of the negative-feedback control causes the hydraulic cylinder pressure to be increased to its maximum value. This can lead to damage of the molded mass in the mold cavity.

A somewhat similar problem is presented by the effect of the mold clamping force upon the performance of such pressure measurements. As the mass of material in the mold sets, it may expand. Such expansion is resisted by the mold clamping force and can lead to the development of pressure-indicating signals greatly exceeding the corresponding desired-value signals. The resultant error signals then cause the hydraulic drive for the injection screw to retract somewhat. However, retraction of the screw drive under such circumstances does not result in a corresponding decrease in the measured mold cavity pressure, and so the screw drive will not cease retracting until it reaches its most retracted end position. However, such premature retraction disturbs the molding cycle and may have a detrimental effect upon the setting process occurring within the mold cavity.

SUMMARY OF THE INVENTION

It is a general object of the invention to provide an injection-molding machine of the general type in question which avoids the disadvantages outlined above and is characterized by high quality of the finished product and very precise reproducibility of individual injection-molding cycles.

This is accomplished, according to one of the broadest concepts of the invention, by resorting to negative-feedback control of the pressures in both the hydraulic cylinder which drives the injection means and in the mold cavity itself. In particular, during the course of one molding cycle there automatically occurs a transition from negative-feedback control of the pressure in the mold cavity to negative-feedback control of the pressure in the hydraulic cylinder of the drive for the injecting means. This transition can be abrupt or relatively gradual. If relatively gradual, there will be a transitional interval during which there is occurring a composite negative-feedback control of both the hydraulic cylinder and mold cavity pressures.

One advantage of this approach is in the ability to separately control, very precisely by means of negative-feedback, the mold cavity pressure at the start of injection-molding cycle and thereafter the hydraulic cylinder pressure. This is advantageous per se, because these two pressures will assume markedly different values during certain portions of the molding cycle. Also inherent in this apprach, as will become clearer from the description below of preferred embodiments, is the possibility of compensating for inaccurate mold-cavity feedback signals which develop during setting of the material in the mold and/or as a result of the mold clamping force itself. Without countermeasures such as disclosed herein, such inaccurate mold-cavity feedback signals can lead to excessive pressure in the mold cavity resulting in damage to the molded product therein or, in the case of feedback signals inaccurately indicative of very low or zero pressure, to interference with the proper course of the injection-molding cycle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 depicts a fourth injection-molding machine embodying the invention.

DESCRIPTION OF THE PREFERRED EMBODIMENTS

Figure 1:
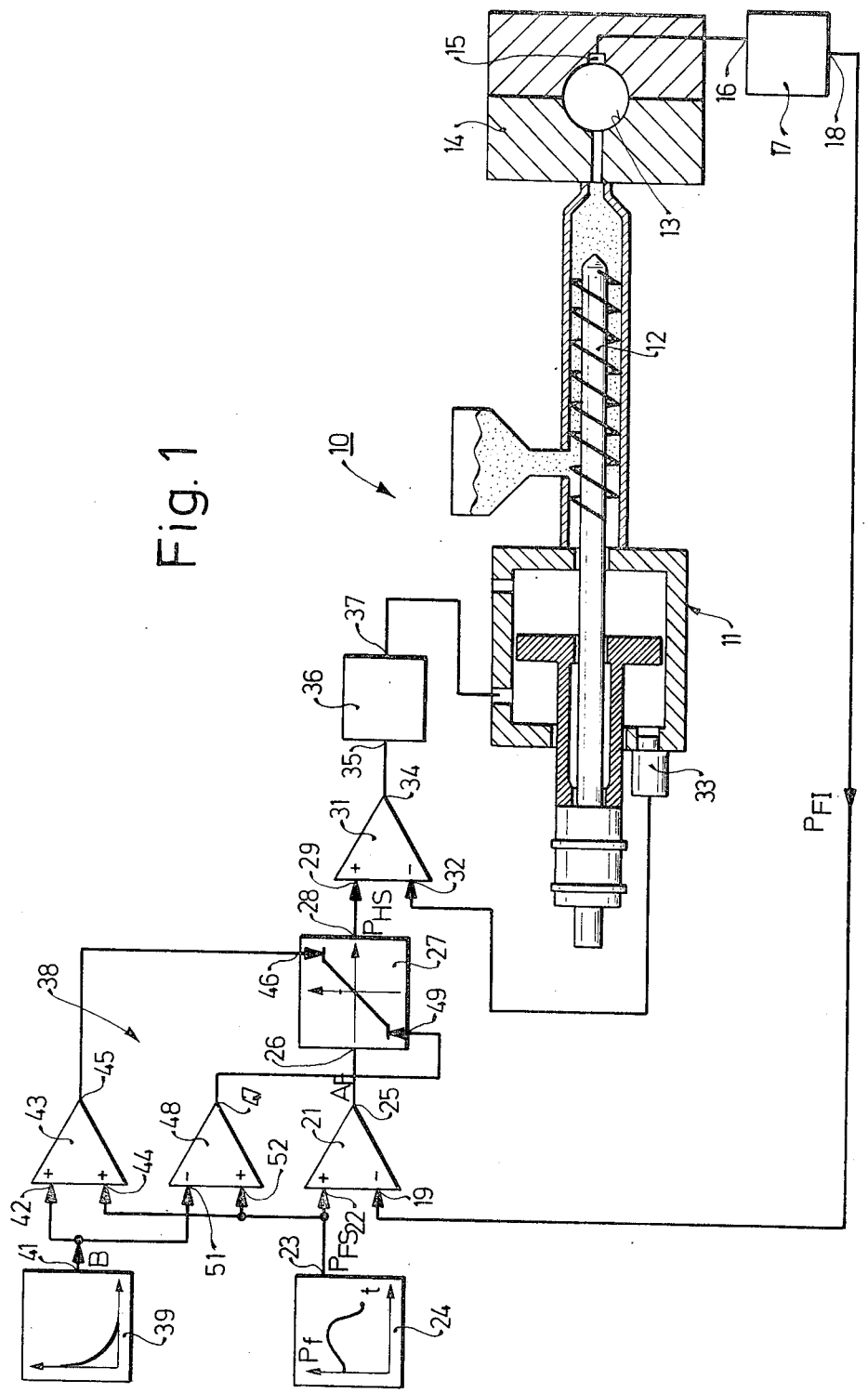
FIG. 1 depicts a first injection-molding machine embodying the invention.

FIG. 1 depicts the injection system of an injection-molding machine 10 for synthetic plastic material. The machine includes an hydraulic cylinder 11 for activating a plastifier and injection screw 12. Screw 12 is operative for pushing the material to be injected (synthetic plastic) into the mold cavity 13 of a mold housing 14. A pressure transmitter 15 senses the pressure inside the mold cavity 13 at the point where transmitter 15 is located and transmits a signal proportional to such pressure to the input of an actual-value (feedback) transducer 17. An output 18 of actual-value transducer 17 is connected to the second input 19 of a first operational amplifier 21, the first input 22 of which is connected with the output 23 of a desired-value signal generator 24. Output 25 of the first operational amplifier 21 is connected with input 26 of a bipolar limiter 27, the output 28 of which is connected with the first input 29 of a second operational amplifier 31. Second operational amplifier 31 has a second input 32 connected with a second actual-value (feedback) transducer 33. Transducer 33 is operative for generating a signal indicative of the hydraulic pressure in the cylinder 11 of the hydraulic cylinder-and-piston unit which drives the ram screw.

Output 34 of second operational amplifier 31 is connected with the input 35 of an electrohydraulic control arrangement 36, particularly a servo valve, the hydraulic output 37 of which supplies hydraulic fluid to the hydraulic cylinder 11.

Associated with bipolar limiter 27 is a limit-value-control circuit arrangement 38, which includes an adjustable signal generator 39. Output 41 of signal generator 39 is connected with the first input 42 of a first summing amplifier 43, the second input 44 of which is connected with the output 23 of the desired-value signal generator 24. Output 45 of first summing amplifier 43 is connected with the first control input 46 of the limiter 27 for controlling the upper limit value of the through-pass range of the limiter; output 47 of a second summing amplifier 48 is connected with the second control input 49 of limiter 27 for controlling the lower limit value of the through-pass range of the bipolar limiter 27. The first input 51 of the second summing amplifier 48 is connected to the output of signal generator 39, whereas its second input 52 is connected with the output of the desired-value signal generator 24.

The first inputs 22, 29 of the two operational amplifiers 21, 31 are non-inverting inputs, whereas the second inputs 19, 32 are inverting inputs. In the case of the first summing amplifier 43, both inputs 42, 44 are non-inverting. In the case of the second summing amplifier 48 only the first input 51 is an inverting input.

The operation of the injection-molding machine 10 will be explained only to the extent necessary for an understanding of the inventive concepts and structure, the balance of the operation being conventional.

Desired-value signal generator 24 is used to preset a certain time-dependent pressure-profile for the pressure in the mold cavity 13. For example, desired-value signal generator 24 may consist of a series of voltage dividers each having an adjustable wiper. A step-by-step switching circuit may read the voltages on the successive voltage-divider taps at regular intervals, for example at intervals at 1/50 of a second, or the like; a smoothing circuit may be employed to convert the discrete values set on the plurality of voltage dividers into a smoother output signal $P_{FS}$. Alternatively, the time-dependent waveform $P_{FS}$ can be made to correspond to the time-dependent pressure waveform $P_f$ shown in FIG. 1 by using a cut-to-order control cam along the control surface of which a potentiometer wiper rides. The selection of the desired mold-cavity pressure waveform $P_{fi}$ and the consequent indirect selection of the desired-value output signal $P_{FS}$, is a matter of ordinary skill and based upon familiar principles, such as the desire to take into consideration the geometry of the mold cavity, the rapidity with which the injected material begins to set upon introduction into the mold cavity, and the like.

In any event, desired-value signal $P_{FS}$ is compared by first operational amplifier 21 against a signal $P_{FI}$ furnished by first feedback transducer 17, resulting in the generation at output 25 of an error signal $A_F$. Signal generator 39 generates an output signal B which may be a constant-magnitude signal, a signal which varies as a preselected function of time and/or of other variables. As will become clearer further below, signal B serves as a transition signal, causing the complex regulating circuitry to undergo a transition from one type of regulation to another type of regulation in a desired manner, e.g., abruptly, continuously, at a certain rate, or the like. The means inside signal generator 39 for generating output signal B can be the same as those described above with respect to desired-value signal generator 24.

In addition to serving as a transition signal, signal B may be used to serve supplemental purposes if desired, for example to correct for empirically observed finished-product quality deficiencies attributable to non-optimal selection of the pressure profile $P_{fi}$ or the like.

In any event, the instantaneous value of the sum of desired-value signal $P_{FS}$ and signal B at the outputs 45, 47 of the summing amplifiers 43, 48 controls the upper and lower limit values of the through-pass range of the bipolar limiter 27. If the value of signal B at a particular moment is relatively large, then the throughpass range presented by bipolar limiter 27 to error signal $A_F$ is relatively large, and consequently the signal $P_{HS}$ at output 28 will equal error signal $A_F$. Signal $P_{HS}$ constitutes an error signal for the mold-cavity-pressure regulating (negative-feedback control) circuit, on the other hand, and simultaneously constitutes the command signal for the cylinder-pressure regulating (negative-feedback control) circuit, on the other hand.

The output signal of the second operational amplifier 31 controls servo valve 36 in such a manner that the pressure in cylinder 11 will automatically vary in a manner maintaining the pressure in mold cavity 13 at the desired value. Accordingly, what is involved at this stage of the operation is regulation (negative-feedback control) of the pressure in mold cavity 13.

In contrast, if the value of signal B at a particular moment is relatively small, then the throughpass range presented by bipolar limiter 27 to error signal $A_F$ will narrow. To the extent that signal B becomes smaller, signal $P_{FS}$ will have a lesser effect upon signal $P_{HS}$ and the latter signal will become more and more exclusively the command signal for the regulation (negative-feedback control) of the pressure in hydraulic cylinder 11. The character of the transition from the regulation (negative-feedback control) of the pressure in mold cavity 13 to the regulation (negative-feedback control) of the pressure in cylinder 11 can be selected in any way desired by suitably preselecting the signal B generated at the output of signal generator 39. Thus, for example, the transition from one regulation to the other regulation can occur continuously or abruptly, depending upon whether waveform B changes smoothly and continuously or abruptly with respect to time.

For the pressure regulation, the following equations apply:

$P_{HS} = A_F$ when $|P_{FS} - A_F| \leq B$
$P_{HS} = A_F \pm B$ when $|P_{FS} - A_F| > B$ The subordinate cylinder-pressure regulating circuit in conjunction with the limit-value-control circuit 38 for the mold-cavity-pressure regulating circuit avoids the difficulties known in the prior art. For example, if the mass undergoing setting in the mold cavity begins to shrink and pull inward away from the pressure transmitter 15, then first feedback transducer 17 will commence to generate a feedback signal inaccurately indicative of lowered mold cavity pressure, possibly even indicative of zero mold cavity pressure. This lowering of the value of feedback signal $P_{FI}$ could, if counter-measures were not taken, lead to the development of a very high error signal $A_F$, resulting in an excessive elevation of the hydraulic pressure in the cylinder and accordingly of the pressure of the setting material in the mold cavity. This could result in damage to the mass undergoing the setting, or less drastically could result in a decrease of its final quality because of the departure from the preselected optimum pressure relationship.

The detrimental effects just referred to can likewise be avoided when the parts of the mold housing are being clamped together, in that the effect of the inaccurate feedback signal $P_{FI}$ is more or less greatly suppressed.

Many other circuit configurations could be employed for the generation of the signal B and for its combination with the desired-value signal $P_{FS}$. For example, the summing amplifiers could have different respective gains making the generation of the separate signal B unnecessary, to begin with.

Figure 2:
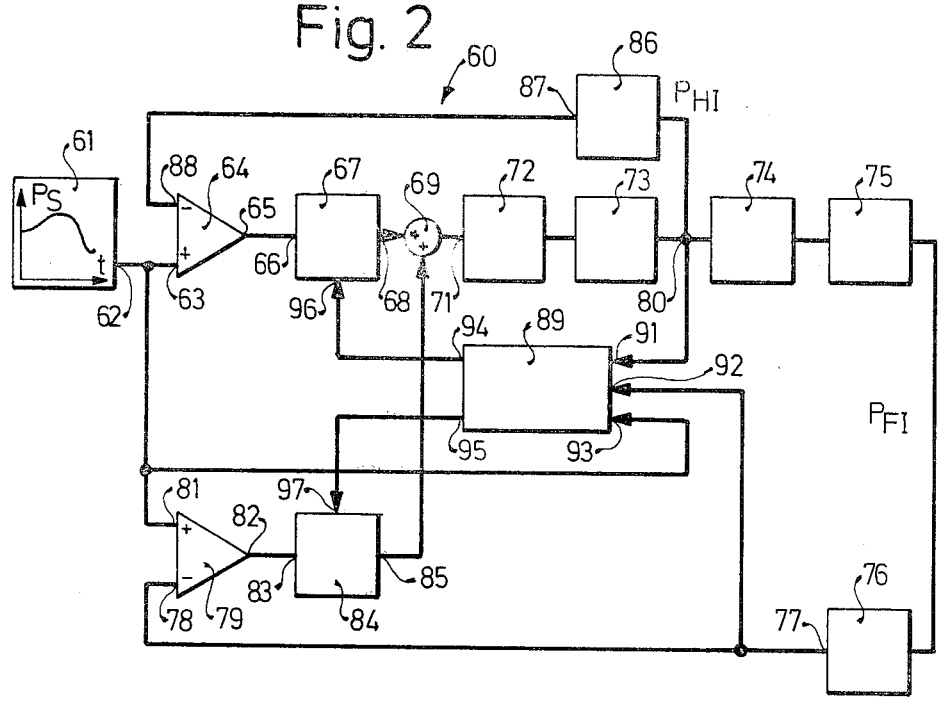
FIG. 2 depicts a second injection-molding machine embodying the invention.

FIG. 2 depicts the injection control system of an injection-molding machine 60 for synthetic plastic material. The system includes a desired-value signal generator 61, the output 62 of which is connected with the first input 63 of a first operational amplifier 64. The latter has an output 65 connected with the input 66 of a first controllable-gain transfer stage 67, the output 68 of which is connected, via a summing junction 69, with the input 71 of an electrohydraulic servo valve 72. Servo valve 72 is connected with a mold cavity 75 through the intermediary of an hydraulic cylinder 73 and a plastifying and injecting screw 74. The pressure in mold cavity 75 is detected by an actual-value (feedback) transducer 76. The output 77 of first feedback transducer 76 is connected to the second input 78 of a second operational amplifier 79, the first input 81 of which is connected with the output 62 of the desired-value signal generator 61. Output 82 of second operational amplifier 79 is connected with an input 83 of a second controllable-gain transfer stage 84, the output 85 of which is connected to summing junction 69. The pressure in hydraulic cylinder 73 is measured at location 80 and fed to a second feedback transducer 86, the output 87 of which is connected with the second input 88 of the first operational amplifier 64.

Furthermore provided is a gain-control stage 89, the first input 91 of which receives a pressure-indicative signal derived from measuring location 80 (for example input 91 could be connected to output 87 of second feedback transducer 86). The second input 92 of gain-control stage 89 is connected with the output 77 of the first feedback transducer 76, and its third input is connected with output 62 of the desired-value signal generator 61. A first output 94 and a second output 95 of the gain-control stage 89 are connected to the gain-control-signal inputs 96 and 97 of the first and second controllable-gain transfer stages 67 and 84.

The operation of the injection-molding machine 60 is as follows:

It is justifiable to assume that the pressure in cylinder 73 stands in the same ratio to the pressure in mold cavity 75 as does the effective surface of the cylinder to that of the screw, so long as the material to be injected is still quite plastic. More specifically, the ratio of the pressure in the mold cavity to the pressure in the cylinder is assumed to remain constant so long as the material to be injected is still quite plastic. Accordingly, the magnitude of such ratio constitutes an indication of the condition of the melt in mold cavity 75. A change in this ratio can be utilized in order to control the transition between the two types of regulation, i.e., from the pure mold-cavity-pressure regulation to the pure cylinder-pressure regulation, with a composite regulation occurring during the transition interval.

Desired-value signal generator 61 is used to apply a time-dependent waveform $P_S$ to the two operational amplifiers 64, 79. This waveform is compared to the feedback signals furnished by first and second feedback transducers 86 and 76. The resulting error signals at the outputs 65, 82 of the operational amplifiers are applied to the inputs of the controllable-gain transfer stages 67, 84, and the output signals of the latter two stages are summed at junction 69. The thusly summed error signal is applied to input 71 of electrohydraulic servo valve 72, which in turn controls the pressure in the mold cavity 75 through the intermediary of cylinder 73 and screw 74. The pressure in the mold cavity 75 and the pressure in the hydraulic cylinder 73 are fed back to the operational amplifiers 79, 64 by respective ones of first and second feedback transducers 76, 86.

At the start of an injection-molding cycle, the material in the mold cavity 75 is still very plastic. As indicated above, when the material to be injected is still very plastic, the ratio between the pressures in the mold cavity and hydraulic cylinder (and accordingly between the corresponding pressure-indicating signals) has a fixed value. Gain-control stage 89 receives these signals via inputs 91, 92, determines the ratio of the signals, and in that way is informed that the material in mold cavity 75 is still very plastic. Under those circumstances, gain-control stage 89 will cause first controllable-gain transfer stage 67 to have zero gain and second controllable-gain transfer stage 84 to have unity gain. Accordingly, there will be a complete suppression of all regulation of the pressure in hydraulic cylinder 73 and the regulating (negative-feedback control) action will involve the pressure in mold cavity 75 exclusively.

As the injection-molding cycle proceeds, the plasticity of the material in mold cavity 75 begins to decrease, and accordingly the ratio of the pressure-indicating signals applied to inputs 91, 92 of gain-control stage 89 begins to deviate from the aforementioned fixed value. As this deviation proceeds, gain-control stage 89 causes the gain of first transfer stage 67 to rise from zero towards unity and causes the gain of second transfer stage 84 to correspondingly decrease from unity towards zero. This complementary rise and fall of the two gains occurs progressively unitl it is now the first transfer stage 67 which has unity gain and the second transfer stage 84 which has zero gain, thereby completing the transition from pure mold-cavity-pressure regulation to pure hydraulic-cylinder-pressure regulation. This continuous transition from the regulation of one pressure to the regulation of the other pressure prevents the material in the mold cavity from being detrimentally subjected to improper abrupt changes of pressure or other interference with the proper course of the injection-molding cycle.

Figure 3:
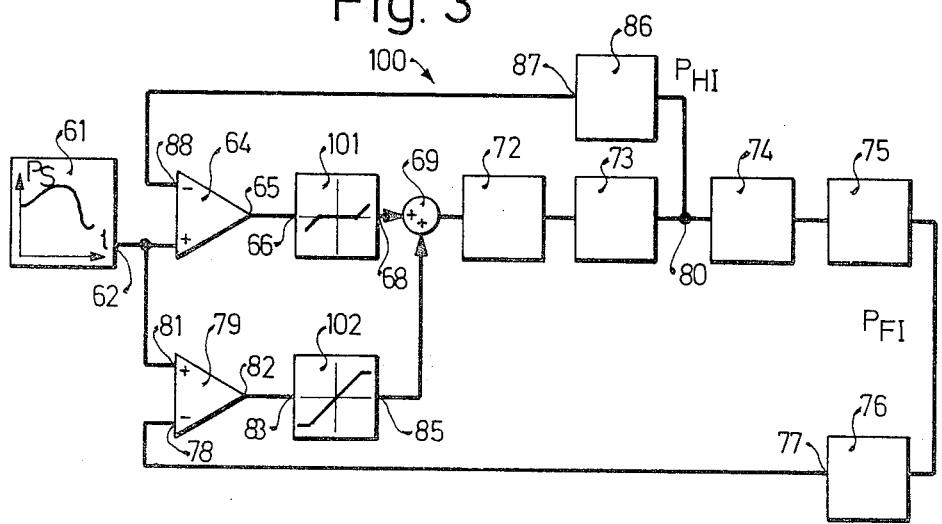
FIG. 3 depicts a third injection-molding machine embodying the invention.

FIG. 3 depicts another injection control system of an injection-molding machine 100 for synthetic plastic material. The injection control system of FIG. 3 differs from that of FIG. 2 in the use of transfer stages 101, 102 so designed as to make unnecessary the use of the gain-control stage 89 of FIG. 2. In other respects, the components of FIG. 3 correspond to those of FIG. 2 and are identified by the same reference numerals.

As graphically depicted in FIG. 3 itself, the first transfer stage 101 passes its input signal only if the input signal is above a certain positive threshold value or below a certain negative threshold value. In contrast, second transfer stage 102 passes its input signal so long as the input signal is above a preselected negative limit value and below a preselected positive limit value; if its input signal is below the negative limit value or above the positive limit value, then the output signal furnished by second transfer stage 102 has the negative or positive limit value, respectively.

The operation of the injection-molding machine 100 differs from that of machine 60 mainly in that the transfer stages 101, 102 need not be controlled by external gain-control signals or the like. Instead, the input-output characteristics of the two transfer stages 101, 102 are themselves such as to result in a transition from regulation of the pressure in mold cavity 75 to regulation of the pressure in hydraulic cylinder 73.

Again, it is assumed that so long as the material in mold cavity 75 remains plastic, the ratio between the pressure in mold cavity 75 and that in cylinder 73 will remain constant. Suitable design of the feedback transducers 76, 86 will ensure that, under such conditions of plasticity, prevailing at the start of the injection-molding cycle, the feedback signals from transducers 76, 86 will be of equal magnitude.

After the mold-filling phase of the injection-molding cycle has been completed and the subsequent pressure phase commences, the cylinder 73 will move practically not at all, because virtually no additional material is being injected into the mold cavity 75 during the pressure phase. Reasoning backward, the non-motion of cylinder 73 will be understood by persons skilled in the servo systems art to correspond to very small values of the error signals at operational amplifier outputs 65 and 82. The pressure, which may be very high, which develops during the pressure phase is attributable to the inherent power amplification of the servo valve 72, not to the magnitudes of the error signals at operational amplifiers 65 and 82; i.e., the servo value 72, operating along its characteristic pressure curve is capable of generating high cylinder pressure even though the error signals at outputs 65, 82 are relatively low in magnitude.

Because the error signals are of low magnitude during this phase, the gain of transfer stage 101 will in effect be zero (because the input signal thereto does not exceed or fall below one of the threshold values) whereas the gain of transfer stage 102 will in effect be unity (because the input signal thereto is well within the range between the positive and negative limit values). Accordingly, there is in effect no feedback of hydraulic-cylinder-pressure information from second feedback transducer 86, the summed error signal at junction 69 will correspond exclusively to the mold-cavity-pressure error signal from output 82, and what will occur will be pure mold-cavity-pressure regulation. This condition is predicated upon the continued existence of the aforementioned proportionality between the hydraulic-cylinder pressure and the mold-cavity pressure during the time interval in which the material in the mold cavity is still quite plastic. Because of this proportionality, the feedback signals applied to operational amplifiers inputs 78, 88 will be equal, so that the error signals at operational amplifier outputs 82, 85 will be equal.

However, as the pressure phase of the injection-molding cycle proceeds, the material in the mold cavity begins to set and loose its plasticity. The ratio between the hydraulic cylinder pressure and the mold cavity pressure deviates from the aforementioned fixed value.

The error signal at the output 65 of first operational amplifier 64 will increase in magnitude and, despite the threshold value set in the first transfer stage 101, will pass through somewhat decreased to reach servo valve 72, so as to prevent the development of undesired reaction effects.

If the setting of the material in the mold cavity 75 results in a decrease in the feedback signal furnishd by the first feedback transducer 76, the limited throughpass range of the transfer stage 102 will prevent the application to servo valve 72 of an error signal so high as to cause the screw 73 to improperly apply to the material in the mold cavity 75 an excessive pressure, such as might damage or detrimentally affect the final quality of the not yet completely set material in the mold cavity.

On the other hand, it may happen during the setting of the material in the mold cavity 75 that the clamping force of the mold housing will cause feedback transducer 76 to feed back a greatly increased signal. If countermeasures were not taken, such signal could result in the retraction of cylinder 73 and accordingly a disturbance of the proper course of the injection-molding cycle. However, the provision of transfer stage 102 with the second limit value thereof takes into account this contingency and prevents such cylinder retraction, with the command signal from desired-value signal generator 61 exerting a relatively greater influence than before via amplifier 64 and transfer stage 101.

FIG. 4 depicts the injection control system of an injection-molding machine 110 which differs from the machine 10 of FIG. 1 mainly in the provision of a discrete hydraulic-cylinder-pressure regulating circuit 112 in parallel to the mold-cavity-pressure regulating circuit 111. The limiting of the value of the error signal which can develop in the mold-cavity-regulating circuit 111 is performed by the error signal which develops in the hydraulic-cylinder-pressure regulating circuit 112 in conjunction with the signal furnished by signal generator 39. In other respects, the components of FIG. 4 correspond to those of FIG. 1 and are identified by the same reference numerals. The operation of the embodiment of FIG. 4 is the same as that of FIG. 1, except for the just-mentioned difference with respect to the limiting of the error signal developed in the mold-cavity-pressure regulating circuit 111.

Many modifications can be made in the embodiments described above without departing from the basic concepts of the present invention. For example, in FIG. 2, the gain-control stage 89 can form either the quotient or the difference of the pressure-indicating signals at its inputs 91, 92, to make possible the desired determination of the viscosity of the material in the mold cavity and the control of the gains of the transfer stages 67, 84 in dependence upon such determination. Likewise, although the use of a single desired-value signal generator for the pressure regulation is particularly advantageous because of the low cost involved, it may in certain circumstances be advantageous to use a second desired-value signal generator. The first desired-value signal generator could be used to preselect the command pressure waveform for the mold cavity, and the second to preselect the command pressure waveform for the hydraulic cylinder, these two pressures assuming markedly different values during certain portions of the injection-molding cycle, as is well known.

In such event, the gain-control stage 89, constituting means for effecting the transition from one type of regulation to the other, would serve to effect the transition from the desired-value output signal of the first desired-value signal generator to the desired-value output signal of the second desired-value signal generator. Instead of the operational amplifiers depicted in the Figures, use could be made of other amplifiers and computing devices and circuits. In the embodiment of FIG. 1, use could also be made of a feedback transducer connected diectly to the mold cavity without the use of a pressure transmitter. The junction 85 in FIGS. 2 and 3 could also be located between servo valve 72 and cylinder 73.

It will be understood that each of the elements described above, or two or more together, may also find a useful application in other types of circuits and constructions differing from the types described above.

While the invention has been illustrated and described as embodied in an injection-molding machine of the type incorporating a plastifying and injection screw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An injection-molding machine of the type which is operative when activated for performing a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting means and operative for driving the injecting means, and including an hydraulic cylinder; and regulating means coupled to the hydraulic drive means and, by controlling the operation of the hydraulic drive means, operative for effecting negative-feedback control of the pressure in the mold cavity and negative-feedback control of the pressure in the hydraulic cylinder, and including means operative during the course of the injection-molding cycle for effecting an automatic transition from negative-feedback control of the mold cavity pressure to negative-feedback control of the hydraulic cylinder pressure, the regulating means comprising a first feedback transducer located to sense the pressure inside the mold cavity and operative for generating a first feedback signal whose value is indicative of the mold cavity pressure, a second feedback transducer located to sense the pressure inside the hydraulic cylinder and operative for generating a second feedback signal whose value is indicative of the hydraulic cylinder pressure, actuating means hydraulically coupled to the hydraulic cylinder and operative for controlling the pressure in the hydraulic cylinder in dependence upon the value of a received actuating signal, the means for effecting the automatic transition comprising means connected to the actuating means and to the first and second feedback transducers and operative for applying to the actuating means in actuating signal whose value varies as a function of variations in the value of the first feedback signal during the negative-feedback control of the mold cavity pressure and whose value varies as a function of variations in the value of the second feedback signal during the negative-feedback control of the hydraulic cylinder pressure.

2. A machine as defined in claim 1, the actuating-signal-applying means comprising means operative for decreasing the effect of the first feedback signal upon the actuating signal and increasing the effect of the second feedback signal upon the actuating signal.

3. A machine as defined in claim 1, the actuating-signal-applying means comprising means operative for decreasing the effect of the first feedback signal upon the actuating signal and progressively increasing the effect of the second feedback signal upon the actuating signal.

4. A machine as defined in claim 1, the actuating-signal-applying means comprising means for progressively varying the effect of at least one of the feedback signals upon the actuating signal.

5. In an injection-molding machine of the type which is operative when activated for performing a complete injection-molding cycle, in combination, means defining a mold cavity; injecting means so located relative to the mold cavity as to be operative for effecting performance of the mold-filling phase of the injection-molding cycle by injecting synthetic plastic material into the mold cavity and thereafter operative for effecting performance of the pressing phase of the injection-molding cycle by maintaining the synthetic plastic material in the mold cavity under pressure; hydraulic drive means connected to the injecting means and operative for driving the injecting means, and including an hydraulic cylinder; and regulating means connected to the hydraulic drive means and, by controlling the operation of the hydraulic drive means, operative for effecting an automatic transition from negative-feedback control of the pressure in the mold cavity to negative-feedback control of the pressure in the hydraulic cylinder, and regulating means comprising first and second feedback transducers respectively located to sense the pessure inside the mold cavity and inside the hydraulic cylinder and operative for generating respective first and second feedback signals which respectively indicate mold cavity pressure and hydraulic cylinder pressure and which have values which vary in proportion to each other during the initial part of the pressing phase but then during the subsequent part of the pressing phase vary non-proportionally to each other, actuating means connected to the hydraulic cylinder and operative for controlling the pressure in the hydraulic cylinder in dependence upon the value of a received actuating signal, and means connected to the first and second transducers and to the actuating means and operative during said initial part of the pressing phase for applying to the actuating means an actuating signal dependent upon the first feedback signal and then during said subsequent part of the pressing phase when the proportionality between the first and second feedback signals is lost applying to the actuating means an actuating signal dependent upon the second feedback signal.

6. A machine as defined in claim 5, the means operative for applying an actuating signal to the actuating means comprises means operative during said initial part of the pressing phase for generating a mold-cavity-pressure error signal dependent upon the first feedback signal and deriving the actuating signal from the mold-cavity-pressure error signal, and operative during said subsequent part of the pressing phase for generating a cylinder-pressure error signal dependent upon the second feedback signal and deriving the actuating signal from the cylinder-pressure error signal, and compensating means operative during said automatic transition for counteracting the difference between the mold-cavity-pressure error signal and the cylinder-pressure error signal at the time of the automatic transition to prevent an abrupt change in the pressures in the mold cavity and in the hydraulic cylinder.

7. An injection-molding machine of the type which is operative when activated for performing a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting means and operative for driving the injecting means, and including an hydraulic cylinder; and regulating means coupled to the hydraulic drive means and, by controlling the operation of the hydraulic drive means, operative for effecting negative-feedback control of the pressures in the mold cavity and in the hydraulic cylinder, and including means operative during the course of the injection-molding cycle for effecting an automatic transition from negative-feedback control of the mold cavity pressure to negative-feedback control of the hydraulic cylinder pressure, the hydraulic drive means including an electrohydraulic control arrangement connected to and supplying the hydraulic cylinder with pressure fluid, the regulating means including a desired-value signal generator operative for generating signals indicative of desired pressures, a first feedback transducer located to sense the pressure inside the mold cavity operative for generating a feedback signal indicative of mold cavity pressure, a first amplifier having a first input connected to the output of the desired-value signal generator and a second input connected to the output of the first feedback transducer, a bipolar limiter having an input connected to the output of the first amplifier, a second feedback transducer located to sense the pressure inside the hydraulic cylinder and operative for generating a feedback signal indicative of the hydraulic cylinder pressure, a second amplifier having a first input connected to the output of the bipolar limiter and a second input connected to the output of the second feedback transducer and an output connected to the input of the electrohydraulic control arrangement, the means for effecting the automatic transition comprising limit-value-control circuit means connected to the bipolar limiter and operative for effecting the transistion by controlling at least one of the limit values of the throughpass range of the bipolar limiter.

8. A machine as defined in claim 7, the bipolar limiter having a pair of control inputs for the receipt of control signals respectively determining the upper and lower limit values of the throughpass range of the bipolar limiter, the limit-value-control circuit means including an adjustable signal generator, and first and second summing amplifiers each having a first input and a second input respectively connected to the outputs of the adjustable signal generator and of the desired-value signal generator, the outputs of the summing amplifiers being connected to respective ones of the control inputs of the bipolar limiter.

9. An injection-molding machine of type which is operative when activated for performing a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting means and operative for driving the injecting means, and including an hydraulic cylinder; and regulating means coupled to the hydraulic drive means and, by controlling the operation of the hydraulic drive means, operative for effecting negative-feedback control of the pressure in the mold cavity and in the hydraulic cylinder and including means operative during the course of the injection-molding cycle for effecting an automatic transition from negative-feedback control of the mold cavity pressure to negative-feedback control of the hydraulic cylinder pressure, the hydraulic drive means including an electrohydraulic control arrangement connected to and supplying the hydraulic cylinder with pressure fluid, the regulating means including a desired-value signal generator operative for generating signals indicative of desired pressures, a first feedback transducer located to sense the pressure inside the mold cavity and operative for generating a feedback signal indicative of the mold cavity pressure, a second feedback transducer located to sense the pressure inside the hydraulic cylinder and operative for generating a feedback signal indicative of the hydraulic cylinder pressure, a first amplifier having a first input connected to the output of the desired-value signal generator and a second input connected to the output of the second feedback transducer, a second amlifier having a first input connected to the output of the desired-value signal generator and a second input connected to the output of the first feedback transducer, first and second transfer stages each having an input connected to the output of a respective one of the first and second amplifiers, the first and second transfer stages each having a control input for receipt of a control signal determinative of the extent to which the signal applied to the transfer stage input is transmitted to the transfer stage output, summing means connecting the outputs of the transfer stages to the input of the electrohydraulic control arrangement, transmission control means having first and second inputs connected to the first and second transducers to receive the feedback signals indicative of the pressures in the hydraulic cylinder and in the mold cavity, the transmission control means further having first and second outputs connected to the control inputs of respective ones of the first and second transfer stages.

10. A machine as defined in claim 9, wherein the transmission control means has a third input connected to the output of the desired-value signal generator means for control of the transmission effected by the first and second transfer stages in dependence upon the desired-value signal.

11. A machine as defined in claim 9, wherein said transmission control means comprises means operative for effecting complementary changes in the extent to which the first and second transfer stages pass to their respective outputs the signals applied to their respective inputs.

12. A machine as defined in claim 9, wherein said transmission control means is operative in response to a deviation of its signals from a predetermined relationship for causing the gain of the first transfer stage to decrease from unity towards zero and the gain of the second transfer stage to rise from zero towards unity.

13. An injection-molding machine of the type which is operative when activated for perfoming a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting means and operative for driving the injection means, and including an hydraulic cylinder; and regulating means coupled to the hydraulic drive means and, by controlling the operation of the hydraulic drive means, operative for effecting negative-feedback control of the pressures in the mold cavity and in the hydraulic cylinder, and including means operative during the course of the injection-molding cycle for effecting an automatic transition from negative-feedback control of the mold cavity pressure to negative-feedback control of the hydraulic cylinder pressure, the hydraulic drive means including an electrohydraulic control arrangement connected to and supplying the hydraulic cylinder with pressure fluid, the regulating means including a desired-value signal generator operative for generating signals indicative of desired pressures, a first feedback transducer located to sense the pressure inside the mold cavity and operative for generating a feedback signal indicative of the mold cavity pressure, a second feedback transducer located to sense the pressure inside the hydraulic cylinder and operative for generating a feedback signal indicative of the hydraulic cylinder pressure, a first operational amlifier having a first input connected to the output of the desired-value signal generator and a second input connected to the output of the second feedback transducer, a second operational amplifier having a first input connected to the output of the desired-value signal generator and a second input connected to the output of the first feedback transducer, first and second transfer stages each having an input connected to the output of the respective one of the first and second operational amplifiers, summing means connecting the outputs of the transfer stages to the input of the electrohydraulic control arrangements, the first transfer stage having a transfer function exhibiting at least one threshold value, and the second transfer stage having a transfer function exhibiting at least one limit value.

14. An injection-molding machine of the type which is operative when activated for performing a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting mcans and operative for driving the injecting means, and including an hydraulic cylinder; and regulating means coupled to the hydraulic drive means and, by controlling the operation of the hydraulic drive means, operative for effecting negative-feedback control of the pressures in the mold cavity and in the hydraulic cylinder, and including means operative during the course of the injection-molding cycle for effecting an automatic transition from negative-feedback control of the mold cavity pressure to negative-feedback control of the hydraulic cylinder pressure, the hydraulic drive means including an electrohydraulic control arrangement connected to and supplying the hydraulic cylinder with pressure fluid, the regulating means including a desired value signal generator operative for generating signals indicative of desired pressure, a first feedback transducer located to sense the pressure inside the mold cavity and operative for generating a feedback signal indicative of the mold cavity pressure, a second feedback transducer located to sense the pressure inside the hydraulic cylinder and operative for generating a feedback signal indicative of the hydraulic cylinder pressure, a first amplifier having a first input connected to the output of the desired-value signal generator and a second input connected to the output of the first feedback transducer, a second amplifier having a first input connected to the output of the desired-value signal generator and a second input connected to the output of the second feedback transducer, a bipolar limiter having an input connected to the output of the first amplifier and having control inputs for receipt of limit-value control signals, the bipolar limiter having an output connected to the input of the electrohydraulic control arrangement, and limit-value-control circuit means connected to the output of the second amplifier and having outputs connected to the control inputs of the bipolar limiter.

15. A machine as defined in claim 14, the limit-value-control circuit means including an adjustable signal generator, a first summing amplifier having a first input connected to the output of the adjustable signal generator and a second input connected to the output of the desired-value signal generator and having an output connected to one of the control inputs of the bipolar limiter for controlling the associated limit value, and a second summing amplifier having a first input connected to the output of the adjustable signal generator and a second input connected to the output of the desired-value signal generator and having an output connected to the other control input of the bipolar limiter for controlling the associated limit value.

16. An injection-molding machine of the type which is operative when activated for performing a complete injection-molding cycle, the machine comprising, in combination, means defining a mold cavity; injecting means so located relative to the mold cavity as to be operative for injecting synthetic platic material into the mold cavity; hydraulic drive means coupled to the injecting means and operative for driving the injecting means, and including an hydraulic cylinder; and regulating means coupled to the hydraulic drive means and, by controlling the operation of the hydraulic drive means, operative for effecting negative-feedback control of the pressure in the mold cavity and in the hydraulic cylinder, and including means operative during the course of the injection-molding cycle for effecting an automatic transition from negative-feedback control of the mold cavity pressure to negative-feedback control of the hydraulic cylinder pressure, the regulating means comprising a first feedback transducer located to sense the pressure inside the mold cavity and operative for generating a first feedback signal whose value is indicative of the mold cavity pressure, a second feedback transducer located to sense the pressure inside the hydraulic cylinder and operative for generating a second feedback signal whose value is indicative of the hydraulic cylinder pressure, actuating means connected to the hydraulic cylinder and operative for controlling the pressure in the hydraulic cylinder in dependence upon the value of a received actuating signal, means connected to the actuating means and operative for applying to the actuating means an actuating signal whose value varies as a function of variations in the value of the first feedback signal during the negative-feedback control of the mold cavity pressure and whose value varies as a function of variations in the value of the second feedback signal during the negative-feedback control of the hydraulic cylinder pressure, the means operative for effecting the automatic transition comprising means connected to the first and second feedback transducers and connected to the actuating-signal-applying means and operative for progressively decreasing the effect of the first feedback signal upon the actuating signal while progressively increasing the effect of the second feedback signal upon the actuating signal.

17. An injection-molding machine of the type which is operative when activated for performing a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting means and operative for driving the injecting means, and including an hydraulic cylinder; and regulating means coupled to the hydraulic drive means and, by controlling the operation of the hydraulic drive means, operative for effecting negative-feedback control of the pressure in the mold cavity and negative-feedback control of the pressure in the hydraulic cylinder, and including means operative during the course of the injection-molding cycle for effecting an automatic transition from negative-feedback control of the mold cavity pressure to negative-feedback control of the hydraulic cylinder pressure, the regulating means comprising a first feedback transducer operative for generating a first feedback signal whose value is indicative of the mold cavity pressure, a second feedback transducer operative for generating a second feedback signal whose value is indicative of the hydraulic cylinder pressure, actuating means connected to the hydraulic cylinder and operative for controlling the pressure in the hydraulic cylinder in dependence upon the value of a received actuating signal, a single desired-value transducer operative for generating a single desired-value signal whose value is indicative of both the desired value of the mold cavity pressure and the desired value of the hydraulic cylinder pressure, and means connected to the transducers and to the actuating means and operative for applying to the actuating means an actuating signal whose value varies as a function of the difference in values between the single desired-value signal and the first feedback signal during the negative-feedback control of the mold cavity pressure and whose value varies as a function of the difference in values between the single desired-value signal and the second feedback signal during the negative-feedback control of the hydraulic cylinder pressure.

18. An injection-molding machine of the type which is operative when activated for performing a complete injection-molding cycle, the machine comprising, in combination, means defining a mold cavity; injecting means so positioned relative to the mold cavity as to be operative for injecting synthetic plastic material into the mold cavity; hydraulic drive means coupled to the injecting means and operative for driving the injecting means, and including an hydraulic cylinder; and regulating means coupled to the hydraulic drive means and, by controlling the operation of the hydraulic drive means, operative for effecting negative-feedback control of the pressure in the mold cavity and negative-feedback control of the pressure in the hydraulic cylinder, and including means operative during the course of the injection-molding cycle for effecting an automatic transition from negative feedback control of the mold cavity pressure to negative-feedback control of the hydraulic cylinder pressure, the regulating means comprising a first feedback transducer located to sense the pressure inside the mold cavity and operative for generating a first feedback signal whose value is indicative of the mold cavity pressure, a second feedback transducer located to sense the pressure inside the hydraulic cylinder and operative for generating a second feedback signal whose value is indicative of the hydraulic cylinder pressure, desired-value transducer means operative for generating a desired-cavity-pressure signal whose value is indicative of the mold cavity pressure variation to be established during the negative-feedback control of the mold cavity pressure and a desired-cylinder-pressure signal whose value is indicative of the hydraulic cylinder pressure variation to be established during the negative-feedback control of the hydraulic cylinder pressure, error-signal generating means connected to the feedback transducers and to the desired-value transducer means and operative during the negative-feedback control of the mold cavity pressure for generating a cavity-pressure-error signal dependent upon the difference between the values of the desired-cavity-pressure signal and the first feedback signal and operative during the negative-feedback control of the hydraulic cylinder pressure for generating a cylinder-pressure-error signal dependent upon the difference between the values of the desired-cylinder-pressure signal and the second feedback signal, actuating means connected to the hydraulic cylinder and operative for controlling the pressure in the hydraulic cylinder in dependence upon the value of a received actuating signal, and actuating-signal-generating means connected to the error-signal generating means and to the actuating means and receiving the error signals and operative during the negative-feedback control of the mold cavity pressure for causing the actuating means to adjust the hydraulic cylinder pressure in a sense counteracting increases in the value of the cavity-pressure-error signal by applying to the actuating means during the negative-feedback control of the mold cavity pressure an actuating signal varying in correspondence to variations in the cavity-pressure-error signal, and operative during the negative-feedback control of the hydraulic cylinder pressure for causing the actuating means to adjust the hydraulic cylinder pressure in a sense counteracting increases in the value of the cylinder-pressure-error signal by applying to the actuating means during the negative-feedback control of the hydraulic cylinder pressure an actuating signal varying in correspondence to variations in the cylinder-pressure-error signal.

* * * * *